United States Patent
Williams

(10) Patent No.: US 12,240,396 B2
(45) Date of Patent: Mar. 4, 2025

(54) VEHICLE AUDIO AND LIGHT SIGNALING SYSTEM AND METHOD OF USE

(71) Applicant: Mariluson Design and Marketing LLC, De Soto, KS (US)

(72) Inventor: Eric B. Williams, De Soto, KS (US)

(73) Assignee: Mariluson Design and Marketing, LLC, De Soto, KS (US)

( * ) Notice: Subject to any disclaimer, the term of this patent is extended or adjusted under 35 U.S.C. 154(b) by 292 days.

(21) Appl. No.: 17/870,160

(22) Filed: Jul. 21, 2022

(65) Prior Publication Data

US 2022/0355752 A1    Nov. 10, 2022

Related U.S. Application Data

(63) Continuation-in-part of application No. 17/135,642, filed on Dec. 28, 2020, now abandoned.

(60) Provisional application No. 62/966,835, filed on Jan. 28, 2020, provisional application No. 62/957,935, (Continued)

(51) Int. Cl.
| | |
|---|---|
| B60R 16/033 | (2006.01) |
| B60Q 1/00 | (2006.01) |
| B60Q 1/46 | (2006.01) |
| B60Q 5/00 | (2006.01) |

(52) U.S. Cl.
CPC .......... *B60R 16/033* (2013.01); *B60Q 1/0088* (2013.01); *B60Q 1/46* (2013.01); *B60Q 5/001* (2013.01)

(58) Field of Classification Search
CPC ...... B60Q 9/00; B60Q 1/0076; B60Q 1/0088; B60Q 5/001; B60Q 1/46; B60Q 1/52; B60Q 2900/10; B60Q 5/00; B60R 16/033
See application file for complete search history.

(56) References Cited

U.S. PATENT DOCUMENTS

| | | | | |
|---|---|---|---|---|
| 5,389,913 A | * | 2/1995 | Boser | B60Q 1/46 340/474 |
| 8,003,902 B1 | * | 8/2011 | Cannella | B60Q 5/001 200/61.54 |
| 8,193,928 B1 | | 6/2012 | Cronmiller et al. | |

(Continued)

OTHER PUBLICATIONS

"International Search Report & Written Opinion, PCT/US 2020/067220".

*Primary Examiner* — An T Nguyen

(74) *Attorney, Agent, or Firm* — Law Office of Mark Brown, LLC; Mark E Brown

(57) ABSTRACT

A vehicle audio output device and light system accommodating sounding the vehicle audible output device and illuminating one or more vehicle exterior lights when a user-operated button is pressed. The electrical circuit includes a battery electrically connected to a horn and light computer. The computer includes a processor and an input/output interface. The system circuit further includes a user-operated button electrically connected to the battery, to a vehicle horn, and to an input port of the system computer. The system computer is electrically connected to a light relay module via an output port, and the light relay module is connected to a vehicle exterior light. The system computer processor can be programmed to illuminate or flash the exterior light as desired. The system may further include a vehicle audio output device and light system switch and may also include a vehicle main computer electrically connected to the light relay module.

1 Claim, 1 Drawing Sheet

Related U.S. Application Data filed on Jan. 7, 2020, provisional application No. 62/954,327, filed on Dec. 27, 2019.

(56) References Cited

U.S. PATENT DOCUMENTS

| | | | |
|---|---|---|---|
| 8,581,126 B1* | 11/2013 | Cannella | B60Q 1/444 |
| | | | 200/61.54 |
| RE46,495 E * | 8/2017 | Cannella | B60Q 1/444 |
| 9,796,441 B1* | 10/2017 | Roshandel | B62J 6/057 |
| 10,369,925 B2* | 8/2019 | Cannella | B60Q 1/525 |
| 2008/0036582 A1 | 2/2008 | Farley | |
| 2008/0055066 A1 | 3/2008 | Griffin | |
| 2012/0303212 A1* | 11/2012 | Miller | G08B 7/06 |
| | | | 701/36 |
| 2016/0082888 A1 | 3/2016 | Kothari | |
| 2016/0355179 A1* | 12/2016 | Cannella | B60T 7/22 |
| 2021/0309144 A1* | 10/2021 | Leaming | B60Q 1/38 |
| 2022/0355752 A1* | 11/2022 | Williams | B60Q 5/00 |

* cited by examiner

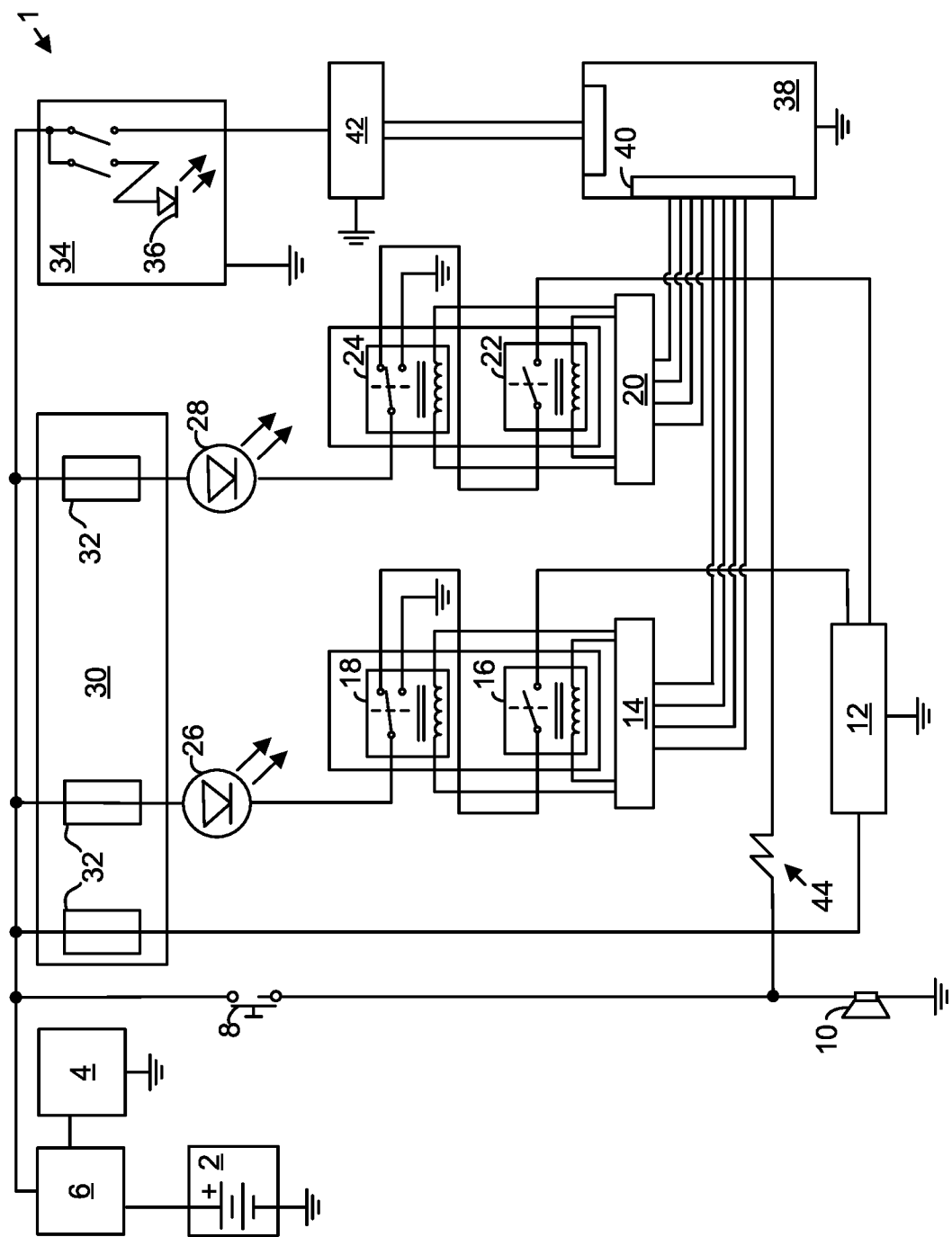

VEHICLE AUDIO AND LIGHT SIGNALING SYSTEM AND METHOD OF USE

CROSS-REFERENCE TO RELATED APPLICATION

This application is a continuation-in-part (CIP) of and claims priority in U.S. patent application Ser. No. 17/135,642, filed Dec. 28, 2020, which claims priority in U.S. Provisional Patent Application No. 62/954,327, filed Dec. 27, 2019; U.S. Provisional Patent Application No. 62/957,935, filed Jan. 7, 2020; U.S. Provisional Patent Application No. 62/966,835, filed Jan. 28, 2020, each of which is incorporated herein by reference.

BACKGROUND OF THE INVENTION

1. Field of the Invention

The present invention relates generally to vehicle audio and light signaling systems and, more specifically, to an integrated audio output device and light system for sounding an audible signal and flashing vehicle lights when an operator presses a button.

2. Description of the Related Art

Safety is of the utmost importance when operating vehicles, including, but not limited to cars, trucks, sport utility vehicles (SUVs), vans, motorcycles, all-terrain vehicles (ATVs), motorized scooters, golf carts, tractors, bicycles, tricycles, boats and all forms of conveyance. Millions of people are killed or injured in vehicle accidents every year. While defensive driving tactics can help prevent many accidents, oftentimes it is necessary to get the attention of another motorist and/or pedestrian while operating a vehicle to help ensure the safety of all parties involved.

Most motor vehicles are equipped with horns which sound when an operator presses a button on the vehicle steering wheel or pulls a cord within the vehicle cabin. Such horns are typically used to alert others of the presence of the operator's vehicle on the roadway or to otherwise get the attention of others. However, in certain situations, sounding a vehicle horn is inadequate to alert another motorist and/or pedestrian. For example, the surrounding area may be so noisy that background noise drowns out the sound of the vehicle horn, or the person to be alerted may be hearing impaired and otherwise unable to hear the horn.

Audible signals can be output with devices other than horns. For example, police and other emergency vehicles typically include public address (PA) systems. Such systems enable law enforcement officers to issue verbal commands while remaining in their vehicles. Applications for such PA systems include traffic stops, during which law enforcement patrol officers can issue commands.

In alternative, modified embodiments of the present invention, vehicle audio systems can include buzzers, bells and prerecorded audible commands. The audio systems can be synchronized with the vehicle lights whereby an operator, such as a law enforcement officer, can simultaneously flash the vehicle lights and issue audible commands. The commands can be preprogrammed. Without limitation on the generality of useful audio output, commands such as "look out," "warning" and "remain in your vehicle" can be preprogrammed for broadcast simultaneously with flashing the vehicle lights when the system of the present invention is activated.

Generally, motor vehicles are also equipped with light systems, including exterior headlights, taillights, turn signal lights, fog lights, bright headlights, and brake lights. These vehicles typically include switches, knobs, or buttons within the cabin of the vehicle which allow the driver to control operation of various exterior lights for use when driving at night or in otherwise low visibility conditions and/or to indicate to others when the driver is turning or changing lanes. A driver can also turn on or flash various exterior lights in an effort to get the attention of others. However, using a standard vehicle light system and associated switches, knobs, or buttons to alert others has disadvantages. For instance, often a driver is operating the vehicle, sometimes at high speeds, when it is necessary or desirable to alert others. This may require the driver to react quickly in order to simultaneously maneuver the vehicle and get the attention of others. With the light system switches, knobs, and/or buttons generally positioned away from the steering wheel and often in multiple different locations, it is difficult for most drivers to quickly and safely flash the headlights to alert another motorist or pedestrian. This is particularly true if the driver also wants to sound the vehicle horn in addition to flashing the headlights to alert the motorist or pedestrian.

Heretofore there has not been available an integrated vehicle audio and light signaling system and method of use with the advantages and features of the present invention.

SUMMARY OF THE INVENTION

The present invention discloses an integrated audio and light signaling system for a motor vehicle which accommodates sounding a vehicle horn or other audio output device and flashing vehicle exterior lights simultaneously with the press of a single button. This system provides the driver with the ability to alert other motorists and/or pedestrians with both audio and visual indicators with minimal diversion of the driver's attention from operating the vehicle steering wheel. In an exemplary embodiment, the present invention includes an aftermarket additional circuit added to a vehicle, the system utilizing the vehicle's existing horn, horn button, and exterior light system. Alternative embodiments include additional exterior lights and/or an additional horn or other audible device, while still utilizing other of the vehicle's original manufactured parts. In further embodiments, the circuit of the present invention may be added to the vehicle during production by the vehicle manufacturer.

Without limitation, the audio systems can include buzzers, bells and PA components. The microprocessor of the present invention can be preprogrammed for synchronizing the lighting output with audio system output.

In an exemplary embodiment, the vehicle horn and light system of the present invention includes a horn and light system computer electrically connected to a vehicle battery. The horn and light system computer includes a processor and a series of input/output ports. The horn and light system computer is further electrically connected to light relay modules connected to vehicle exterior lights, to a vehicle horn, and to a system button located on or near the steering wheel of the vehicle. In another exemplary embodiment, a standard vehicle main computer is separately electrically connected to the vehicle battery and to the light relay modules for operation of standard exterior light switches, knobs, or buttons.

In another exemplary embodiment of the present invention, the vehicle audio (e.g., horn, buzzer, bell and PA) system and the vehicle light system can be synchronized. For example, the system of the present invention can include and audio and light system switch electrically connected to the vehicle battery and to the audio and light system computer. When the audio and light system switch is flipped to the on position, the additional circuit of the present invention is connected such that the horn and light system computer is electrically connected to the vehicle battery, to the light relay modules, to the vehicle horn, and to the system button. When the horn and light system switch is flipped to the off position, the additional circuit of the present invention is disconnected, but the standard exterior light switches, knobs, and/or buttons are configured to still operate the exterior lights, and the system button, which in a preferred embodiment is the original equipment manufacturer (OEM) vehicle horn button, still sounds the vehicle horn. In an alternative embodiment of the present invention, the horn and light system does not include a horn and light system switch so that the horn and light system is configured for sounding the vehicle horn (or activating another audible signal) and illuminating the system vehicle external lights as programmed by the system computer whenever the vehicle horn button is pressed.

In operation of an embodiment of the present invention, when the horn and light system switch is in the on position and a user presses the standard vehicle horn button, the horn sounds, powered by the vehicle battery, and the vehicle exterior lights also turn on or flash as controlled by the horn and light system computer processor, also powered by the vehicle battery. The horn and light system computer processor can be programmed to operate the vehicle exterior lights when the system button is pressed in different modes, as desired. In exemplary embodiments, the horn and light system computer processor is programmed to flash the vehicle exterior lights when the system button is pressed, either with alternating or simultaneous flashes of the driver and passenger side exterior lights. In another aspect of the present invention, the horn and light system of the present invention is configured to still operate the flashing exterior lights as programmed when the horn and light system switch is flipped on and the system button is pressed, even when the standard vehicle headlight switch controller is set to on and the vehicle exterior lights are illuminated.

BRIEF DESCRIPTION OF THE DRAWINGS

The drawings constitute a part of this specification and include exemplary embodiments of the present invention illustrating various objects and features thereof.

FIG. 1 shows a circuit diagram of a motor vehicle integrated horn and exterior light system embodying the present invention.

DETAILED DESCRIPTION OF THE PREFERRED EMBODIMENTS

I. Introduction and Environment

As required, detailed aspects of the present invention are disclosed herein, however, it is to be understood that the disclosed aspects are merely exemplary of the invention, which may be embodied in various forms. Therefore, specific structural and functional details disclosed herein are not to be interpreted as limiting, but merely as a basis for the claims and as a representative basis for teaching one skilled in the art how to variously employ the present invention in virtually any appropriately detailed structure.

Certain terminology will be used in the following description for convenience in reference only and will not be limiting. For example, up, down, front, back, right and left refer to the invention as orientated in the view being referred to. The words, "inwardly" and "outwardly" refer to directions toward and away from, respectively, the geometric center of the aspect being described and designated parts thereof. Forwardly and rearwardly are generally in reference to the direction of travel, if appropriate. Said terminology will include the words specifically mentioned, derivatives thereof and words of similar meaning.

II. Preferred Embodiments

The present invention covers an integrated horn, or other audible signal, and light system 1 for a motor vehicle, or other means of conveyance, which allows a driver/operator to sound a vehicle horn 10 and to flash vehicle exterior lights 26, 28, such as but not limited to vehicle headlights, with the press of a single system button 8. The present system 1 provides an additional safety mechanism for the motor vehicle by providing the driver with an efficient and safe way to alert other motorists and/or pedestrians on a roadway with both audio and visual indicators with minimal diversion of the driver's attention from operating the vehicle steering wheel. The horn and light system 1 of the present invention can be utilized with any type of motor vehicle, including but not limited to cars, trucks, sport utility vehicles (SUVs), vans, motorcycles, all-terrain vehicles (ATVs), motorized scooters, golf carts, tractors, and boats.

In an exemplary embodiment of the present invention, the horn and light system 1 includes an aftermarket additional electrical circuit connected to the existing original equipment manufacturer (OEM) vehicle circuit system and further utilizing OEM parts of the vehicle as part of the additional electrical circuit. In one preferred embodiment, the present invention utilizes the existing OEM vehicle battery 2 and associated alternator 4 and battery fuse terminal block 6; the vehicle horn 10; the vehicle horn button 8; the vehicle exterior lights 26, 28; and light fuses. In this embodiment, the vehicle circuit is further connected to the OEM vehicle computer and exterior light switch controller 12, which is configured to continue to operate normally. In alternative embodiments, an aftermarket additional electrical circuit may utilize additional exterior lights and/or an additional horn or other audible microphone device in place of the OEM vehicle exterior lights and/or horn. However, such embodiments are still electrically connected to the OEM vehicle circuit system and still utilize other of the vehicle's original manufactured parts, including but not limited to the battery 2, alternator 4, and battery fuse terminal block 6. In alternative embodiments, all the components of the circuit of the present invention are included during original production of the vehicle by the vehicle manufacturer, rather than the additional horn and light system circuit being an aftermarket addition.

FIG. 1 is a circuit diagram showing an exemplary embodiment of a motor vehicle horn and light system 1 of the present invention. In this embodiment, the vehicle horn and light system 1 includes a horn and light system switch 34 which is electrically connected to a vehicle battery 2 and to a horn and light system computer 38. In alternative embodiments, the horn and light system 1 does not include a horn and light system switch 34, and the system 1 circuit is configured for illuminating or flashing vehicle exterior lights 26, 28 and sounding a vehicle horn 10 any time a vehicle horn button 8 is pressed. In the embodiment shown in FIG. 1, the horn and light system switch 34 includes two positions: an on position and an off position. When the horn and light system switch 34 is flipped to the on position, the horn and light system 1 circuit is engaged and electrically connects the horn and light system computer 38 to the vehicle battery 2 for powering the exterior lights 26, 28 as programmed when a vehicle horn button 8 is pressed. When the horn and light system switch 34 is in the off position, the power to the horn and light system computer 38 for lighting the vehicle exterior lights 26, 28 is disconnected. With the horn and light system switch 34 flipped to the off position, the vehicle horn 10 can still be sounded by pressing the vehicle horn button 8, and the vehicle exterior lights 26, 28 can still be operated with use of the main vehicle computer and light switch controller 12. However, with the system switch 34 turned to off, the vehicle exterior lights 26, 28 will not flash as programmed by the horn and light system computer 38 along with the horn 10 sounding when the vehicle horn button 8 is pressed.

In a preferred embodiment, the horn and light system switch 34 includes a user-operated knob, button, or other actuator and is positioned within the vehicle cabin so that a driver of the vehicle has convenient access to the switch. However, alternatively, the horn and light system switch 34 can be positioned elsewhere on the vehicle, including but not limited to under the hood of the vehicle. In an exemplary embodiment, the horn and light system switch 34 is a double pole single throw (DPST) switch, as shown in FIG. 1. In this embodiment, one of the switch poles connects to an indicator light 36, such as but not limited to a light-emitting diode (LED) light, incandescent bulb, or neon light. When the switch 34 is in the on position, the indicator light 36 illuminates, providing notice to the driver that the horn and light system 1 circuit is active. However, other embodiments include a switch 34 without an indicator light. Such embodiments may include a single pole single throw (SPST) or alternative type of switch. Embodiments of the horn and light system switch 34 of the present invention may include tactical and/or audible indicators when the system switch 34 is moved from one position to the other in place of or in addition to an indicator light 36. Other embodiments include a horn and light system 1 without a system switch 34 within the circuit.

In an exemplary embodiment of the present invention, the horn and light system switch 34 is electrically connected to a vehicle battery terminal fuse block 6, which is electrically connected to the vehicle battery 2 and an alternator 4. The alternator 4 is configured to charge the vehicle battery 2 and provide additional electric power to the circuit when the vehicle engine is running, as is standard in most modern automobiles. Alternative embodiments include vehicle circuits which include a vehicle battery 2 but no alternator for providing power to the electrical circuit. In a preferred embodiment, the vehicle battery 2 is a standard 12-volt automotive battery and has an associated alternator 4. However, other embodiments may include alternative types of batteries. In an exemplary embodiment, the horn and light system 1 circuit of the present invention is configured to operate whether or not the vehicle engine is running, but in alternative embodiments, the horn and light system 1 circuit may be configured to only operate when the vehicle ignition switch is turned on and the vehicle engine is running.

In an exemplary embodiment, as shown in FIG. 1, the horn and light system switch 34 is connected to the horn and light system computer 38 through a 12-volt to 5-volt direct current (DC) to DC converter 42. The converter 42 is configured for converting the 12-volt DC voltage from the vehicle battery to 5-volt DC voltage provided to the horn and light system computer 38.

The horn and light system computer 38 includes a processor and an input/output interface having a series of input/output ports 40. The horn and light system computer 38 may optionally further include a cooling fan to help prevent overheating of the electrical input and output lines and/or the computer processor. Moreover, the horn and light system computer 38 may optionally include a display screen and user interface for programming and customization of the system. Such a display and user interface may be located within the cabin of the vehicle, in close proximity to the system computer 38, or in any other location on the vehicle. The horn and light system computer 38 is electrically connected to the vehicle horn button 8 and vehicle horn 10 circuit such that when a user presses the horn button 8, the horn and light system computer 38 receives an electrical current from the circuit as input. The electrical connection from the vehicle horn button 8 circuit to the horn and light system computer 38 further includes a resistor 44 configured for reducing voltage from the vehicle battery 2 to a desired operating voltage for input to the horn and light system computer 38. The system computer 38 is also electrically connected to a driver side exterior light relay module 14 and a passenger side exterior light relay module 20, which are connected to driver side and passenger side exterior vehicle lights 26, 28, respectively. The circuit of the present invention further includes a fuse box 30 having light fuses 32 connected to the lights of the system 1.

The vehicle horn button 8 is electrically connected to the vehicle battery 2 and to the horn 10 such that when the button 8 is pressed by a user, the circuit is activated, and current from the battery 2 is sent to the horn 10, sounding the horn 10. The circuit of the present invention is further configured so that pressing the horn button 8 sends voltage through a resister 44 and then as input to the horn and light system computer 38. The vehicle horn button 8 of the present invention is positioned in close proximity to the vehicle steering wheel such that an operator can press the horn button 8 when operating the vehicle. In a preferred embodiment, the vehicle horn button 8 is integrated into the vehicle steering wheel. However, alternative embodiments can include a horn and light system button 8 positioned elsewhere on the vehicle. Moreover, the system 1 may include a pull cord within the vehicle cabin for sounding the horn 10 and flashing the exterior lights 26, 28 rather than a button.

In an embodiment of the present invention, a vehicle main computer and exterior light switch controller 12 is separately electrically connected to the vehicle battery 2 and to the driver side exterior light relay module 14 and passenger side exterior light relay module 20. Such main computer 12 may be an original equipment manufacturer (OEM) vehicle main computer 12 and associated OEM exterior light system switches. The main computer and exterior light switch controller 12 accommodates standard operation of the vehicle exterior lights 26, 28 with operation of standard vehicle exterior light on/off switches, knobs, or buttons.

Each of the driver side and passenger side light relay modules 14, 20 includes a first light relay 16, 22 and a second light relay 18, 24 connected in series. The second light relay 18, 24 is electrically connected to the respective driver side 26 or passenger side exterior light 28. Each exterior vehicle light 26, 28 in the circuit is further connected to a fuse 32. Two light relays in series accommodate operation of the horn and light system 1 whether or not standard vehicle exterior light switches are turned on.

In an exemplary embodiment, the horn and light system computer 38 processor is programmed for illuminating the vehicle exterior lights 26, 28 in the circuit when the horn and light system switch 34 is set to the on position and when the horn and light system computer 38 receives input from the vehicle horn button 8 being pressed. In a preferred embodiment, the horn and light system computer 38 processor is programmed to flash the driver side vehicle exterior light 26 and the passenger side vehicle exterior light 28 when the system switch 34 is on and the vehicle horn button 8 is engaged. Embodiments include the processor being programmed to illuminate the circuit vehicle exterior lights 26, 28 with alternating or simultaneous flashes of the driver side 26 and passenger side exterior lights 28 or illuminating the exterior lights 26, 28 the entire time the vehicle horn button 8 is pressed. In some embodiments, the horn and light system 1 of the present invention includes multiple mode settings configured for selection by a user for illuminating or flashing the driver side 26 and passenger side vehicle exterior lights 28 when the horn and light system switch 34 is on and the horn button 8 is pressed.

When the standard vehicle exterior light on/off switch(es), knob(s), or button(s) are turned on for standard vehicle operation with the vehicle headlights on; the horn and light system switch 34 is in the on position; and the vehicle horn button 8 is pressed, the first light relay 16, 22 of each light relay module 14, 20 is configured for disconnecting the vehicle main computer 12 from the circuit vehicle exterior lights 26, 28 so that output from the horn and light system computer 38 controls the illumination and/or flashing of the exterior lights 26, 28 as programmed while the horn button 8 is engaged. In this configuration, when a user stops pressing the horn button 8, input to the horn and light system computer 38 is then disconnected, which stops output from the horn and light system computer 38 to the exterior light relay modules 14, 20, and the vehicle main computer and exterior light switch controller 12 electrical connection to the exterior light relay modules 14, 20 resumes control of the illumination of the vehicle exterior lights 26, 28 based on the settings of the exterior light switches. In an alternative embodiment of the present invention, the horn and light system 1 can be configured for only flashing the vehicle exterior lights 26, 28 when the standard vehicle exterior light switch, knob, or button is turned off. In further embodiments, a single vehicle computer can be configured for controlling the horn and light system 1 circuit and standard operation of the vehicle exterior light switch controller circuit rather than including a separate horn and light system computer 38 and main computer 12.

The integrated vehicle exterior lights 26, 28 of the present horn and light system 1 may be vehicle standard headlights, bright or high beam headlights, taillights, or additional vehicle exterior lights added specifically as components of the horn and light system 1. In an exemplary embodiment, the present invention can be configured for flashing either the vehicle headlights or taillights when the horn button is pressed, depending on the direction of travel of the vehicle. The system 1 may also optionally include one or more dashboard lights to notify the driver when the horn and light system switch 34 is activated during operation of the vehicle.

In an exemplary embodiment, the vehicle horn and light system 1 of the present invention can further be equipped with various adjustment buttons or knobs to adjust components of the system to the operator's preferences, such as but not limited to whether the exterior lights 26, 28 flash on and off or stay illuminated until the horn button 8 is released; which exterior lights 26, 28 flash, such as but not limited to regular headlights, bright headlights, and/or taillights, when the button 8 is pressed; and the duration of each exterior light flash.

In additional embodiments of the present invention, the motor vehicle horn and light system 1 includes exterior vehicle sensors and a processor connected to the vehicle circuit and configured for controlling operation of the exterior lights 26, 28 and horn 10 in response to detecting an object in close proximity to the sensors. Such sensors may be configured to only be active during operation of the vehicle. Embodiments include systems having sensors and automated operation of the lights 26, 28 and horn 10 in addition to a user-operated horn and light system button 8 or, alternatively, only sensors and automated lights and horn operation with no button. Some embodiments may include sensor adjustment knobs and/or switches for turning the sensors on and off and/or adjusting the sensitivity of the sensors. Embodiments of the present invention including exterior sensors and a processor for automated operation of the exterior lights and horn may be integrated into an automated, "self-driving" vehicle which utilizes artificial intelligence to operate the vehicle.

In another embodiment of the motor vehicle horn and light system 1, the system circuit includes sensors for detecting activation of the vehicle anti-lock brake system (ABS) and a processor. In this embodiment, the vehicle horn 10 sounds and system exterior lights 26, 28 illuminate when the anti-lock brake system is engaged. This provides visual and audible notification to other motorists and/or pedestrians that the vehicle operator is having to stop the vehicle quickly. Such ABS sensor integration into the vehicle horn and light system circuit may be in addition to a manual, user-operated horn and light system button 8 or in place of a user-operated button 8. The ABS sensor may also be in addition to exterior sensors for detection of objects in close proximity and operation of the horn and exterior lights.

It is to be understood that the invention can be embodied in various forms and is not to be limited to the examples specifically discussed above. The range of components and configurations which can be utilized in the practice of the present invention is virtually unlimited.

Having thus described the invention, what is claimed as new and desired to be secured by Letters Patent is:

1. A horn and light system for a motor vehicle including headlights, taillights, forward and reverse directions of travel and an anti-lock braking system (ABS), which horn and light system includes:
   a battery configured for supplying power to an electrical circuit;
   said electrical circuit including a horn and light system computer electrically connected to said battery;
   said system computer comprising a processor and an input/output interface;
   said input/output interface comprising an input port and an output port;
   said electrical circuit further including a system button electrically connected to said battery, to a vehicle horn, and to said input port of said system computer input/output interface;
   wherein said system button is configured for activating said electrical circuit and supplying a voltage from said battery to said vehicle horn and to said input port when said system button is pressed;
   a light relay module electrically connected to said output port of said system computer input/output interface and to a vehicle exterior light;

wherein said system computer is configured for supplying an output voltage to said light relay module upon receiving said voltage to said input port;

said light relay module is configured for illuminating said vehicle exterior light upon receiving said output voltage from said system computer;

wherein said voltage supplied to said vehicle horn sounds said vehicle horn;

said processor programmed for actuating said vehicle lights and horn when said vehicle ABS is activated;

said processor is programmed for flashing said vehicle headlights when said vehicle is traveling in a forward direction and said ABS is activated; and said processor is programmed for flashing said vehicle taillights when said vehicle is traveling in a reverse direction and said ABS is activated.

\* \* \* \* \*